(12) United States Patent
Park et al.

(10) Patent No.: US 10,326,702 B2
(45) Date of Patent: Jun. 18, 2019

(54) DATA SERVICE LEVELS

(71) Applicant: Facebook, Inc., Menlo Park, CA (US)

(72) Inventors: David S. Park, Los Altos, CA (US);
Tony Yaoyuan Zhang, San Mateo, CA (US); Aayush Bahuguna, Mountain View, CA (US); Nathan Paul Schloss, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 195 days.

(21) Appl. No.: 14/857,102

(22) Filed: Sep. 17, 2015

(65) Prior Publication Data

US 2017/0085497 A1    Mar. 23, 2017

(51) Int. Cl.
*H04L 12/859* (2013.01)
*H04L 12/741* (2013.01)
*H04L 29/08* (2006.01)

(52) U.S. Cl.
CPC ........ *H04L 47/2475* (2013.01); *H04L 45/745* (2013.01); *H04L 67/02* (2013.01)

(58) Field of Classification Search
CPC .................................................. H04L 47/2475
USPC ....................................................... 709/245
See application file for complete search history.

(56) References Cited

U.S. PATENT DOCUMENTS

| | | | | |
|---|---|---|---|---|
| 5,715,403 A * | 2/1998 | Stefik | ...................... | G06F 21/10 705/44 |
| 6,157,719 A * | 12/2000 | Wasilewski | ............. | H04L 63/04 348/E5.004 |
| 6,252,964 B1 * | 6/2001 | Wasilewski | ............. | H04L 63/04 348/E5.004 |
| 7,269,576 B2 * | 9/2007 | Stefik | ...................... | G06F 21/10 375/E7.009 |
| 7,480,701 B2 * | 1/2009 | Smith | .................... | H04N 7/167 348/E5.006 |
| 7,701,870 B2 * | 4/2010 | Bhatia | ..................... | H04L 12/14 370/252 |
| 7,725,453 B1 * | 5/2010 | Chen | ................. | G06F 17/30864 707/711 |
| 8,051,057 B2 * | 11/2011 | Abu-Hakima | .... | G06F 17/30864 455/466 |
| 8,180,720 B1 * | 5/2012 | Kovacs | ............... | H04L 67/2842 706/47 |
| 8,850,490 B1 * | 9/2014 | Thomas | ........... | H04N 21/47211 725/109 |
| 9,319,836 B2 * | 4/2016 | Jodlauk | ................. | H04W 4/021 |
| 9,762,547 B2 * | 9/2017 | Binder | .................... | H04L 63/18 |
| 9,772,915 B2 * | 9/2017 | Brown | .................. | G06F 11/203 |
| 2001/0001014 A1 * | 5/2001 | Akins, III | ............... | H04L 63/04 380/241 |
| 2003/0110130 A1 * | 6/2003 | Pelletier | ................. | G06Q 30/02 705/50 |
| 2003/0131353 A1 * | 7/2003 | Blom | .................. | H04L 63/0428 725/25 |

(Continued)

*Primary Examiner* — Ondrej C Vostal
(74) *Attorney, Agent, or Firm* — Baker Botts L.L.P.

(57) ABSTRACT

In one embodiment, a method includes sending a request for full-service data to a first Internet protocol (IP) address; determining that a successful response to the request for full-service data was not received; sending a request for limited data to a second IP address based on the determination that a successful response to the request for full-service data was not received; and receiving a successful response to the request for limited data. The limited data includes a subset of the full-service data.

20 Claims, 10 Drawing Sheets

(56) References Cited

U.S. PATENT DOCUMENTS

| | | | | |
|---|---|---|---|---|
| 2004/0230676 | A1* | 11/2004 | Spivack | G06F 17/30908 709/223 |
| 2005/0157218 | A1* | 7/2005 | Honma | H04L 29/06 348/744 |
| 2006/0235803 | A1* | 10/2006 | Romney | G06Q 30/06 705/65 |
| 2007/0174624 | A1* | 7/2007 | Wolosewicz | G06F 21/10 713/176 |
| 2007/0217421 | A1* | 9/2007 | Kametani | H04L 29/12066 370/392 |
| 2007/0250573 | A1* | 10/2007 | Rothschild | G06F 17/30867 709/205 |
| 2008/0189617 | A1* | 8/2008 | Covell | G06F 17/3089 715/738 |
| 2010/0094878 | A1* | 4/2010 | Soroca | G06F 17/30035 707/748 |
| 2010/0106852 | A1* | 4/2010 | Kindig | G06F 17/30035 709/231 |
| 2010/0131670 | A1* | 5/2010 | Ishii | H04L 47/10 709/233 |
| 2010/0205221 | A1* | 8/2010 | Shaw | G06F 16/958 707/802 |
| 2010/0223394 | A1* | 9/2010 | Sherer | H04L 29/06027 709/231 |
| 2010/0257051 | A1* | 10/2010 | Fernandez Gutierrez | G06Q 30/02 705/14.43 |
| 2011/0225417 | A1* | 9/2011 | Maharajh | G06F 21/10 713/150 |
| 2012/0093145 | A1* | 4/2012 | Anchan | H04W 28/24 370/352 |
| 2012/0209990 | A1* | 8/2012 | Honore | H04L 12/1496 709/224 |
| 2012/0220261 | A1* | 8/2012 | Grefen | H04L 43/0876 455/406 |
| 2012/0253894 | A1* | 10/2012 | Suomela | G06F 8/61 705/14.1 |
| 2013/0017803 | A1* | 1/2013 | Li | H04L 12/1403 455/406 |
| 2013/0046879 | A1* | 2/2013 | Garcia | H04L 43/0811 709/224 |
| 2014/0025949 | A1* | 1/2014 | Kay | H04L 63/0428 713/168 |
| 2014/0047413 | A1* | 2/2014 | Sheive | H04L 65/403 717/110 |
| 2014/0075445 | A1* | 3/2014 | Wang | G06F 9/50 718/104 |
| 2014/0245189 | A1* | 8/2014 | Berger | H04L 67/306 715/753 |
| 2014/0351834 | A1* | 11/2014 | Srivastav | H04N 21/4126 725/1 |
| 2016/0182736 | A1* | 6/2016 | Tiger | H04W 48/18 455/406 |
| 2016/0253710 | A1* | 9/2016 | Publicover | G06Q 30/02 705/14.66 |
| 2016/0261751 | A1* | 9/2016 | Tubi | H04M 15/39 |
| 2017/0004057 | A1* | 1/2017 | Brown | G06F 11/203 |
| 2017/0012955 | A1* | 1/2017 | Petrack | H04L 63/08 |

* cited by examiner

DATA SERVICE LEVELS

TECHNICAL FIELD

This disclosure generally relates to networked computing devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more network content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, altimeter, accelerometer, or gyroscope. Such a device may also include functionality for wireless communication over any conventional technology, such as, by way of example and not limitation, BLUETOOTH, near-field communication (NFC), radio frequency (e.g., RFID), infrared (IR), Wi-Fi, pager, or cellular (e.g., 2G, 3G, 4G). Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, notifications of activity on a social-networking system may be delivered to a user on a mobile computing device even when the user does not have a data plan or has zero balance on their data plan through a "zero-rated" service with their network provider. A zero-rated service may be an arrangement where the network provider provides limited data to the user without charge. In particular embodiments, the notifications may include information of a "friend" request or social-network activity relevant to the user (e.g., new post by a friend, "like" of a post, comment on a post, etc.). In particular embodiments, an online service may support two tiers of service: a data service for users with available data and a zero-rated tier for users with a zero balance. The zero-rated tier may be provided as a "preview" mode with limited functionality. In particular embodiments, a user interface (UI) of a native application may include an offer to purchase data.

In particular embodiments, the social-networking system may support two sets of Internet protocol (IP) addresses for receiving and responding to client requests: the first set may provide a limited set of data and functionality allowed in a "free" tier of data services, and the second set may provide full-service data or functionality provided in the default tier of data or functionality. In particular embodiments, the mobile computing device may send a request for full-service data to the default IP address and then only send requests to the zero-rated IP address when no response is received from the default IP address.

In particular embodiments, a user may interact with the social-network using a native application installed on the mobile computing device. For users with a zero balance on their data plan, the native application may provide limited social-networking functionality (e.g., notification tab and friend request tab) through the "zero-rated" IP addresses. In addition, the native application may surface a banner to prompt the user to purchase data in order to access full social-networking functionality. For example, the banner may show the user various data plan options that are available and allow the user to purchase additional data through the application. As another example, the banner may direct the user to contact their network provider to purchase additional data.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims, but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
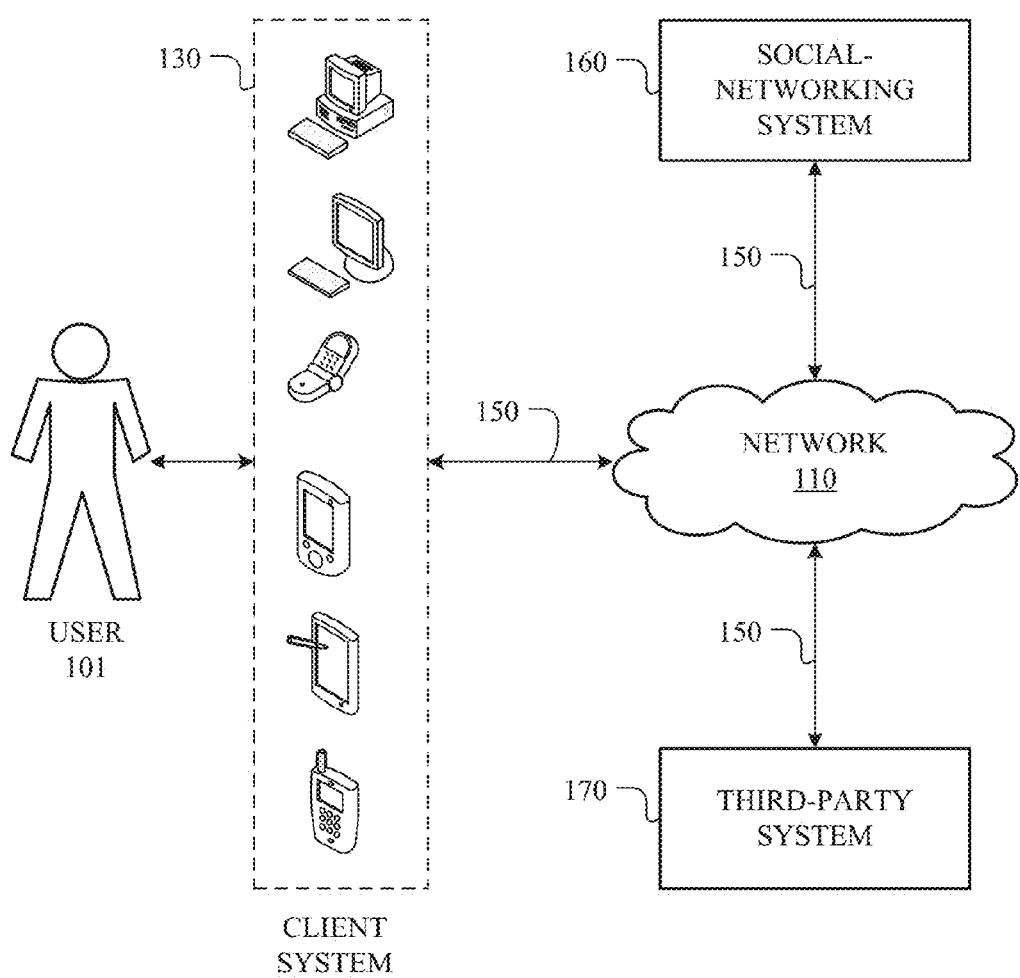
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110.

Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Links 150 connecting client system 130 to network 110 may be configured to send data using a wireless communication standard (e.g., Global System for Mobile Communications (GSM), enhanced data rates for GSM evolution (EDGE), third generation of mobile telecommunications technology (3G), or fourth generation long term evolution (4G LTE)). In particular embodiments, links 150 between client system 130 and network 110 may be provided by a cellular network provider. Cellular network providers may not provide any or unlimited free cellular data communication to their customers through links 150 to network 110. Instead, a user of client system 130 may be charged for data bandwidth that is sent through link 150. In some cases, data (e.g., a request for data) sent by client system 130 through link 150 may not be received social-networking system 160 if the user does not have available data bandwidth with the cellular network provider. Additionally, data (e.g., a notification) sent by social-networking system 160 may not be received by client system 130 through link 150 if the user does not have available data bandwidth.

In particular embodiments, some access to network 110 may be "zero rated," where data sent over one or more links 150 may not contribute to a limited data bandwidth plan of the user. Zero-rated cellular network access may not generate a fee to the user, even if that user is over a limited quantity of allocated or pre-paid cellular data bandwidth, or where such an allocated or pre-paid cellular data access does not exist. Zero-rated cellular access may be dependent on the specific network 110 accessed, and in particular embodiments, the cellular network provider may have a list of one or more network addresses—such as internet protocol (IP) addresses—to which users may have zero-rated access.

In particular embodiments, the provider of network 110 may receive a data request through links 150 and compare the destination of the request to a list of zero-rated destinations to determine whether the data request is zero-rated or should generate charges to the client. If a request received from client system 130 is on the list of zero-rated destinations, which may be denominated and indexed by IP address, the data request may not generate specific data bandwidth charges to the user of client system 130. If the data request received from client system 130 is not on the list of zero-rated destinations, the provider of network 110 may charge the user's account—such as prospectively to a future monthly bill or reducing a balance of available data bandwidth or prepaid amount—for the data bandwidth used in sending the data request and, if applicable, receiving a response.

Figure 2:
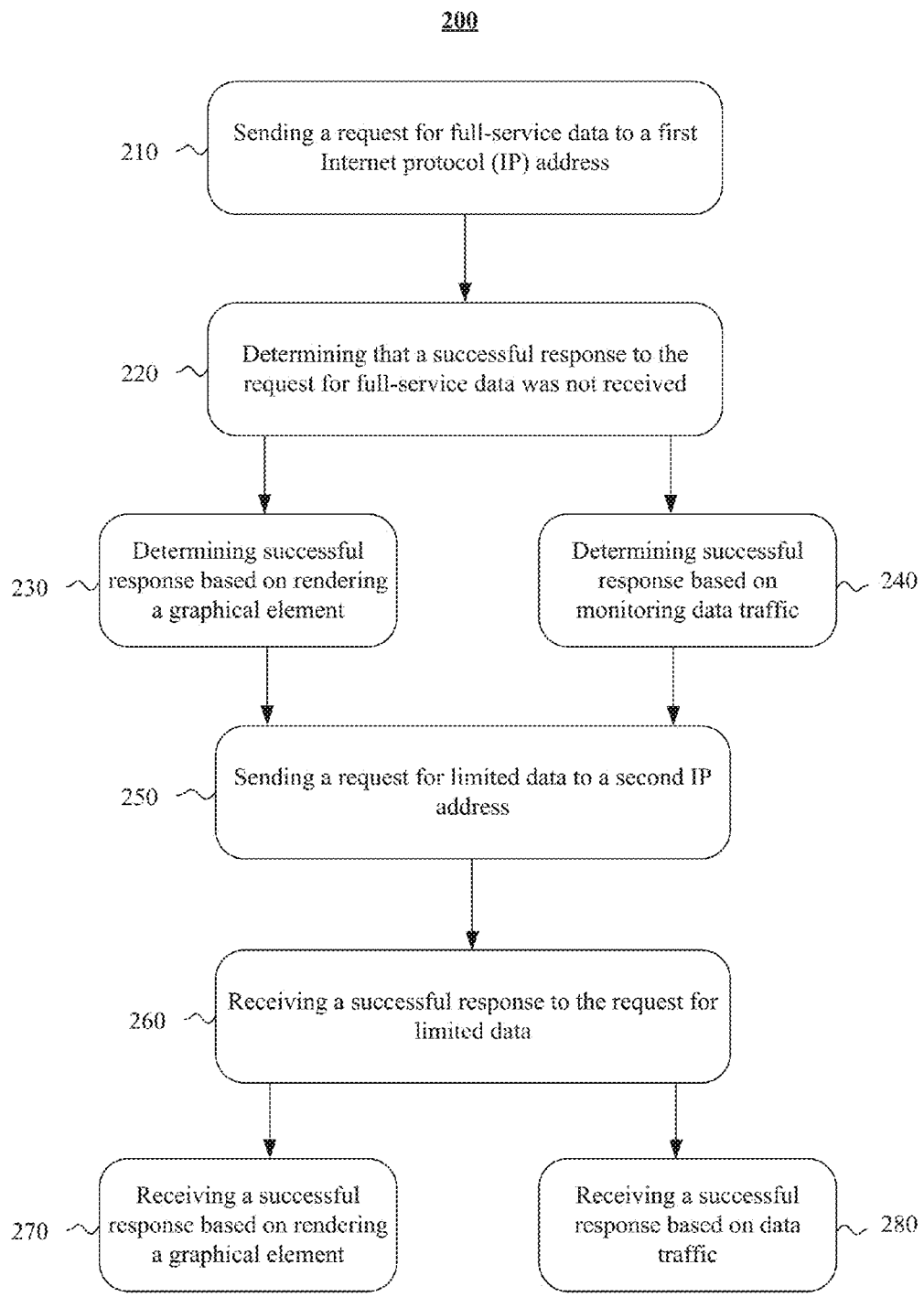
FIG. 2 illustrates an example method for determining a data bandwidth balance of a computing device.

FIG. 2 illustrates an example method 200 for determining a data bandwidth balance of a computing device. In particular embodiments, one or more servers of social-networking system 160 or third-party system 170 may be configured to interface with client system 130 through two sets of IP addresses. As an example and not by way of limitation, a first set of IP addresses may be configured to provide the default access to the user accessing social-networking system 160 through client system 130. In step 210, a client system 130 of a user sends a request for full-service data to a first IP address. As an example and not by way of limitation, the full-service data may correspond to data associated with the default access to social-networking system 160. The full-service data may include content objects of social-networking system 160, as described above. Client system 130 may interface with social-networking system 160 through web browser 132 or through a native application associated with social-networking system 160. As an example and not by way of limitation, the native application may be an application of a social network (e.g., FACEBOOK) and the social-networking application may send a request for data (e.g., posts, newsfeed, or friend requests) to the first IP address associated with social-networking system 160. In particular embodiments, full-service data sent over the first address corresponds to a paid service with the cellular network provider.

In step 220, client system 130 determines that a successful response to the request for full-service data was not received. In particular embodiments, client system may determine that a successful response was not received based on receiving a partial response, unexpected response, incorrect response, or error message in response to sending the request for full-service data. As an example and not by way of limitation, a request sent by web browser 132 for full-service data may receive an HTTP 504 time-out error message indicating that the request for full-service data was not successful. As another example, an unsuccessful response may be a partial rendered content object that is displayed on web browser 132 in response to the request for full-service data.

In step 230, the full-service data sent to client system 130 may include data corresponding to a graphical element. As an example and not by way of limitation, the full-service data may include JAVASCRIPT that renders the pixel on web browser 132 of client system 130. JAVASCRIPT is a dynamic programming language used as part of web browsers 132 and whose implementations provide for client-side scripts to interact with the user, control web browser 132, communicate asynchronously with a server, or alter the content that is displayed on web browser 132. Improper or incomplete rendering of the graphical element on web browser 132 of client system 130 may be an indication of an unsuccessful response to the request for full-service data.

In step 240, a native application of client system 130 may send a request to receive data or content through the first IP address. As described above, the native application may be an application of a social network (e.g., FACEBOOK) and the social-networking application may send a request to social-networking system 160 for data (e.g., posts, newsfeed, or friend requests). In particular embodiments, client system 130 may monitor the data traffic between social-networking system 160 and the native application that is taking place through the first IP address. Furthermore, client system 130 may determine that a successful response to the request sent through the first set of IP addresses was not received based on a lack of data traffic between social-networking system 160 and client system 130 through the first IP address. As an example and not by way of limitation, the lack of data traffic through the first set of IP address may manifest as an error message, such as for example a time-out error.

In step 250, client system 130 sends a request for limited data to a second IP address based on the determination that a successful response to the request for full-service data was not received. The absence of data or minimal data exchanged in response to the request sent to the second IP address may be an indication that the user no longer has available data. As described above, servers of social-networking system 160 may configured to interface with client system 130 through a second IP address (e.g., zero-rated) that are configured to provide a limited set of functionality to the user. As described below, limited data may be a subset of the full-service data. Client system 130 may interface with social-networking system 160 through web browser 132 or through a native application associated with social-networking system 160. As an example and not by way of limitation, the native application may be an application of a social network (e.g., FACEBOOK) and the social-networking application may send a request for data (e.g., posts, newsfeed, or friend requests) to the second IP address associated with social-networking system 160.

In particular embodiments, in response to not receiving a successful response to the request for data, servers 162 of social-networking system 160 may send limited data to client system 130. The data from social-networking system 160 may correspond to data of socially relevant activity to the social-networking application (e.g., information of a new post by a friend of the user, liking a post, a comment on a post by a friend of the user, or any combination thereof).

In step 260, client system 130 receives a successful response to the request for limited data. As described above, the limited data may be a subset of the full-service data. Limited data may include a notification with a link to a social-networking system 160 with access to a subset of the functionality of social-networking system 160. As an example and not by way of limitation, the notification may include a link that provides access to friend requests that were made using social-networking system 160. As another example, limited data may include a notification that indicates a friend of the user has performed some socially relevant activity, such as for example commented on a post or sent the user a message. In particular embodiments, the limited data may be notifications of socially relevant activity sent through the second set of IP addresses as short message service (SMS) messages ("text messages"). For example, the text notification may be a stripped down version of a notification that may include a link (e.g., hyperlink) to the social-networking mobile website through the preview mode that allows access to the notification tab and friends request tab. In particular embodiments, the limited data sent over the second address correspond to a zero-rated service with the cellular network provider.

In step 270, the limited data sent to client system 130 through the second IP address may include data, such as for example JAVASCRIPT that renders the pixel on web browser 132 of client system 130. Successful or complete rendering of the pixel on web browser 132 of client system 130 may be an indication of a successful response to the request for limited data.

In step 280, client system 130 may monitor the data traffic between the native application of client system 130 and social-networking system 160 or third-party system 170. As an example and not by way of limitation zero-rated servers 162 of social-networking system 160 may process a request for data sent through the second IP address and respond to the request by sending limited data to client system 130 through the second IP address. Client system 130 may determine that an expected amount of limited data that is exchanged between the native application and social-networking system 160 through the second IP address corresponds to a successful response to the request for limited data. In particular embodiments, if client system 130 does not receive a successful response to the request for limited data, client system 130 may not be connected to network 110 or is experiencing a network issue.

In a second example, method 200 may include steps to reduce the likelihood of erroneously determining client system 130 has exceeded its data allocation due to an unreliable data connection. In particular embodiments, client system 130 may monitor requests for full-service data in the background. In step 210, a client system 130 of a user may send one or more requests for full-service data to a first IP address. In step 220, client system 130 determines that a successful response to the request for full-service data was not received. In particular embodiments, the determination may be based on a pre-determined number of consecutive unsuccessful requests (e.g. four) for full-service data. In particular embodiments, client system 130 may enter a zero-rated detection mode based on the determination of step 220.

The zero-rated detection mode of client system 130 may send another request to the first IP address and determine determines that a successful response to the request for full-service data was received. Then based on the determination that a successful response to the request for full-service data was received, client system 130 may substantially simultaneously send a pre-determined number of requests (e.g., eight) for full-service data to the first IP address and, in step 250, a smaller pre-determined number of requests (e.g., four) for limited data to the second IP address. In particular embodiments, client system 130 may operate in the preview mode, described above, if client system 130 determines a successful response to the requests for full-service data was not received and at least successful request for limited data was received. In particular embodiments, if client system 130 determines that a successful response to any of the requests for full-service data was received, then client system 130 may exit the preview mode and go to standard mode. Furthermore, if a successful response to the requests for full-service data and the requests for limited-data were not received, client system 130 may determine that it is not connected to a data network. Client system 130 may repeat the steps described above after a pre-determined amount of time.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
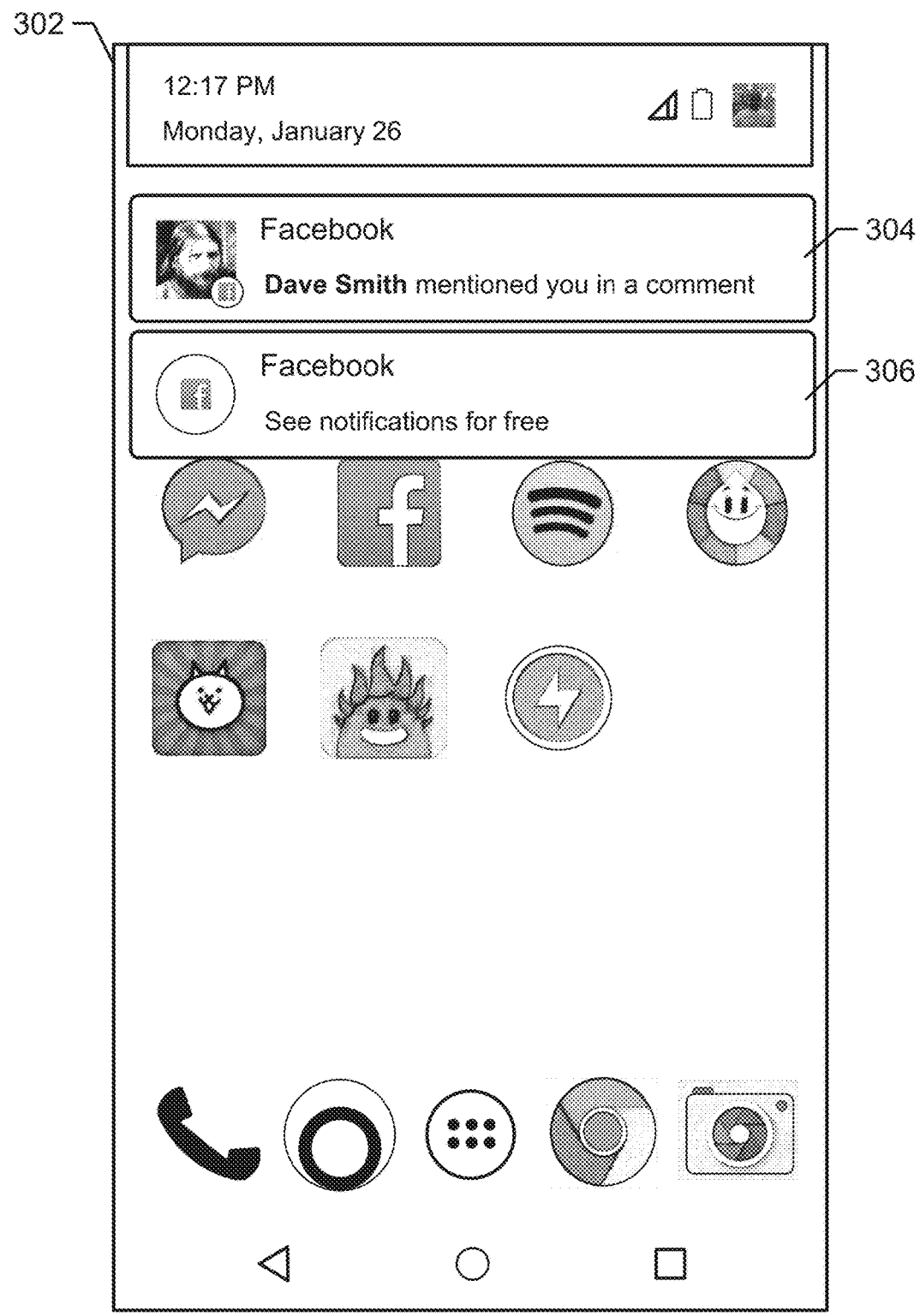
FIGS. 3-8 illustrate example limited-data user interfaces (UI) of a client system.

FIGS. 3-8 illustrate example limited-data user interfaces (UI) of a client system. Although this disclosure illustrates and describes particular UIs having a particular configuration of particular graphical elements with particular functionality, this disclosure contemplates any UI that has any suitable configuration of any suitable graphical elements with any suitable functionality. Furthermore, although this disclosure illustrates and describes particular UIs associated with particular social-networking functionality, this disclosure contemplates any UIs associated with any suitable social-networking functionality. As described above, it may be determined that the user of client system 130 has a zero or low balance on their data plan on a cellular data network. In particular embodiments, the zero-rated data may be provided as a "preview" mode that provides a subset of the social-networking functions of social-networking system 160, such as updates or friend request. Furthermore, limited data provided as part of a zero-rated service may include a subset of the content or functionality as compared to data provided as part of a full-service plan. As illustrated in the example of FIG. 3, a UI 302 corresponding to a home screen of client system 130 may display one or more banners 304 that correspond to notifications of activity on social-networking system 160. As an example and not by way of limitation, banner 304 may include a notification of a new post by a friend of the user, liking a post, or a comment on a post by a friend of a user. Furthermore, notification 304 may be a zero-rated notification that is provided to the user without charge and may include information of a friend of the user has mentioned the user in a comment. Furthermore, UI 302 may include banner 306 that provides information to the user that social-networking system 160 has provided a zero-rated service to the user. In particular embodiments, banner 306 may include information that allows the user to purchase data through their cellular network provider. As described above, the notifications displayed in banners 304 and 306 may be sent to client system 130 through zero-rated IP addresses.

Figure 4:
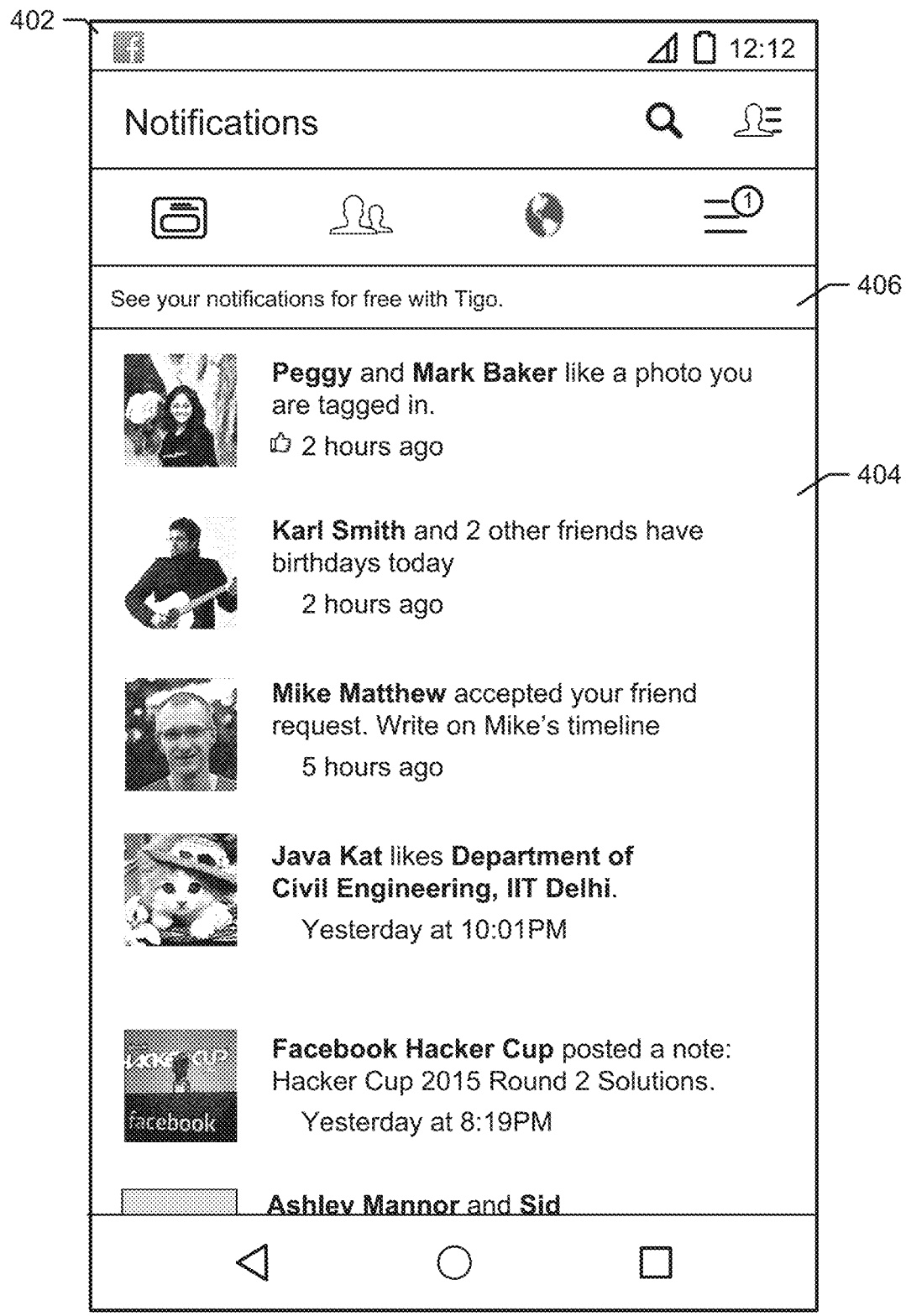
Figure 5:
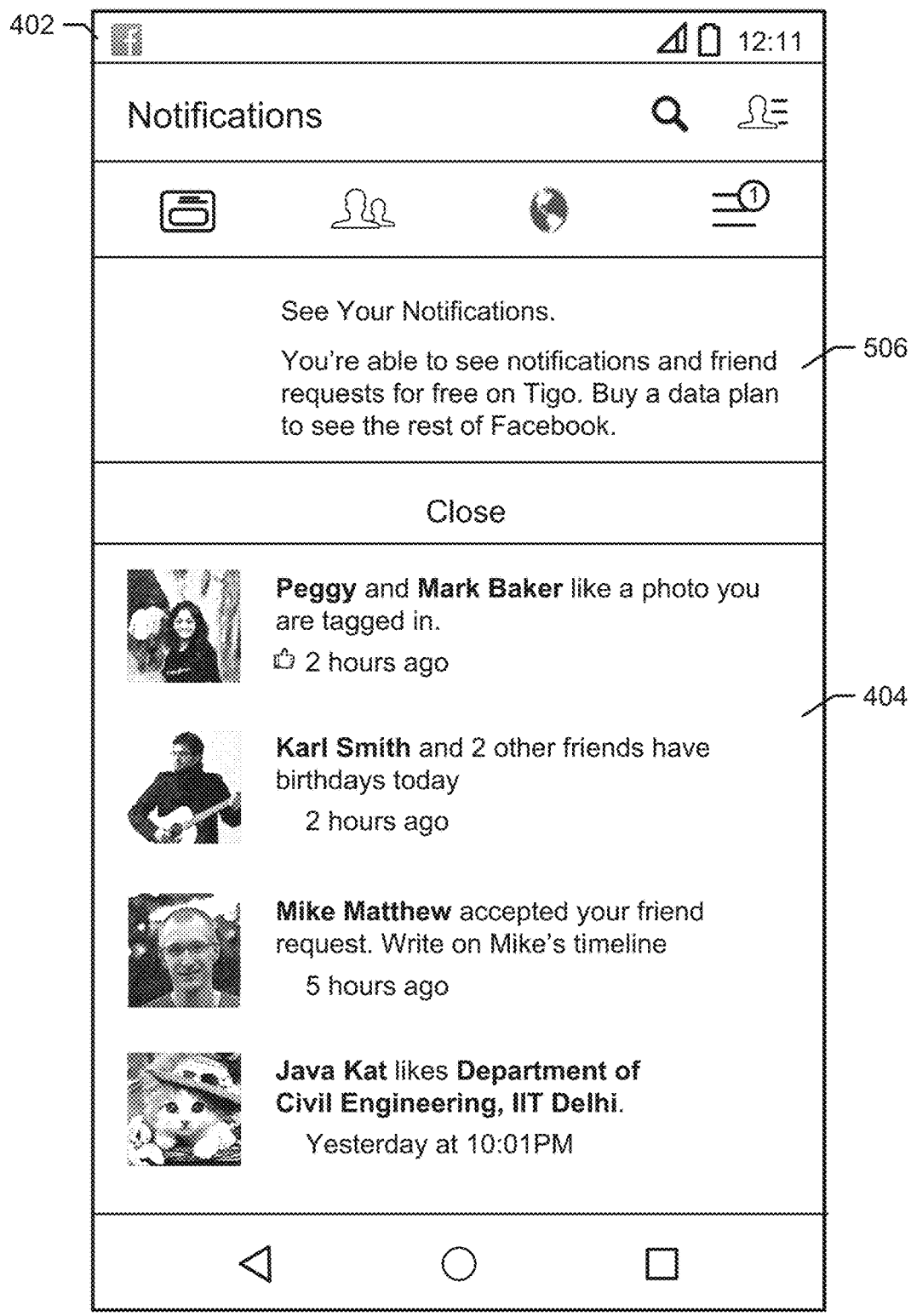

As illustrated in the examples of FIGS. 4-5, a UI 402 corresponding to a native application of social-networking system 160 may display one or more notifications 404 of activity on social-networking system 160. As an example and not by way of limitation, notifications 404 may include information notifying the user of a new post by a friend of the user, liking a post, or a comment on a post by a friend of a user. In particular embodiments, notifications 404 may include a summary of the socially relevant activity and a time the activity was performed on social-networking system 160. Furthermore, UI 402 may include information 406 indicating that notifications 404 are being provided as part of a zero-rated service through one or more entities (e.g., cellular network provider or social network). In particular embodiments, additional information may be provided to the user in response to selecting information 406. As described above, the notifications 404 may be sent to client system 130 through zero-rated IP addresses of social-networking system 160. As illustrated in the example of FIG. 5, information 506 may include information that informs the user that additional functionality of social-networking system 160 is available upon purchase of data from a cellular network provider.

Figure 6:
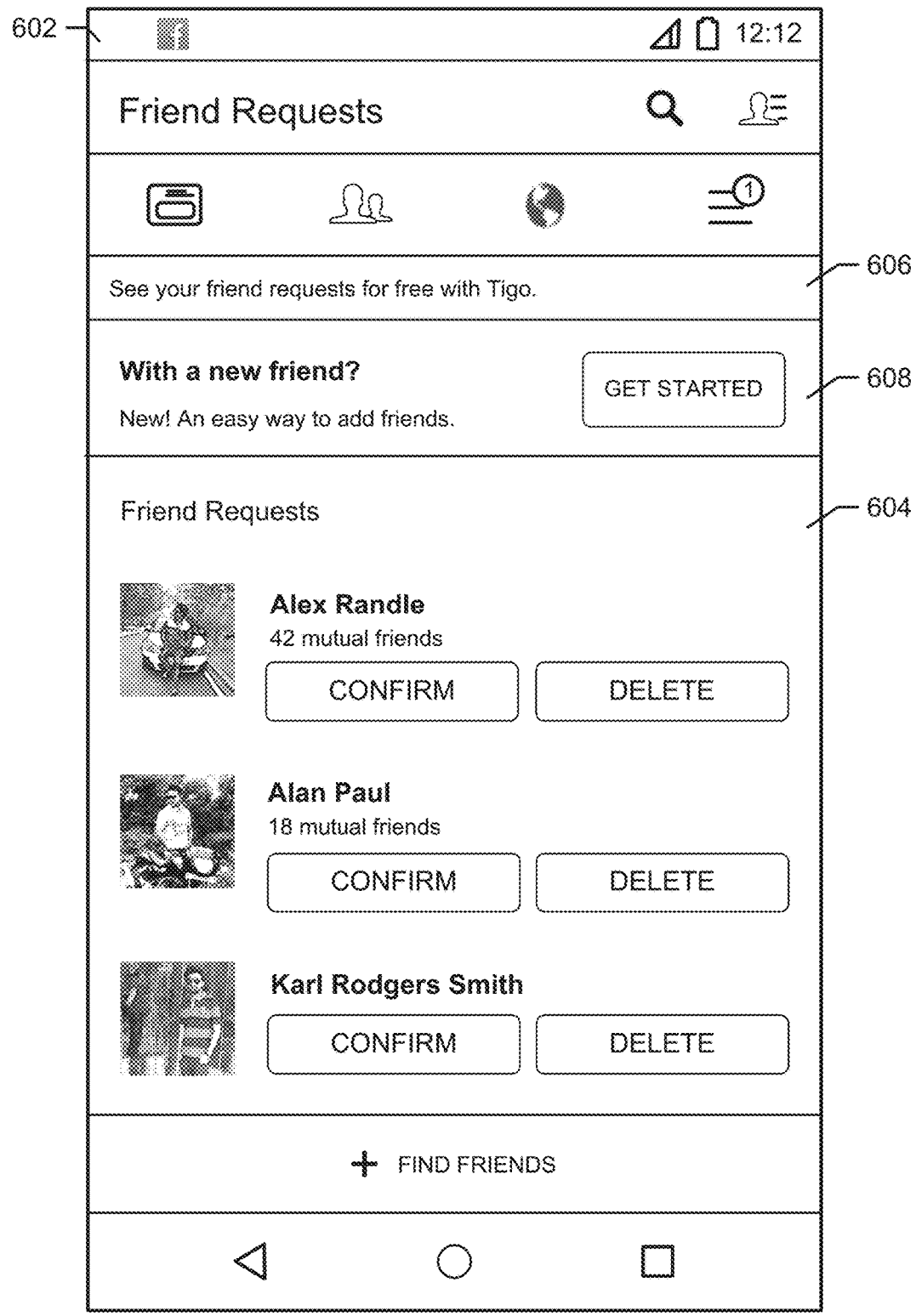
Figure 7:
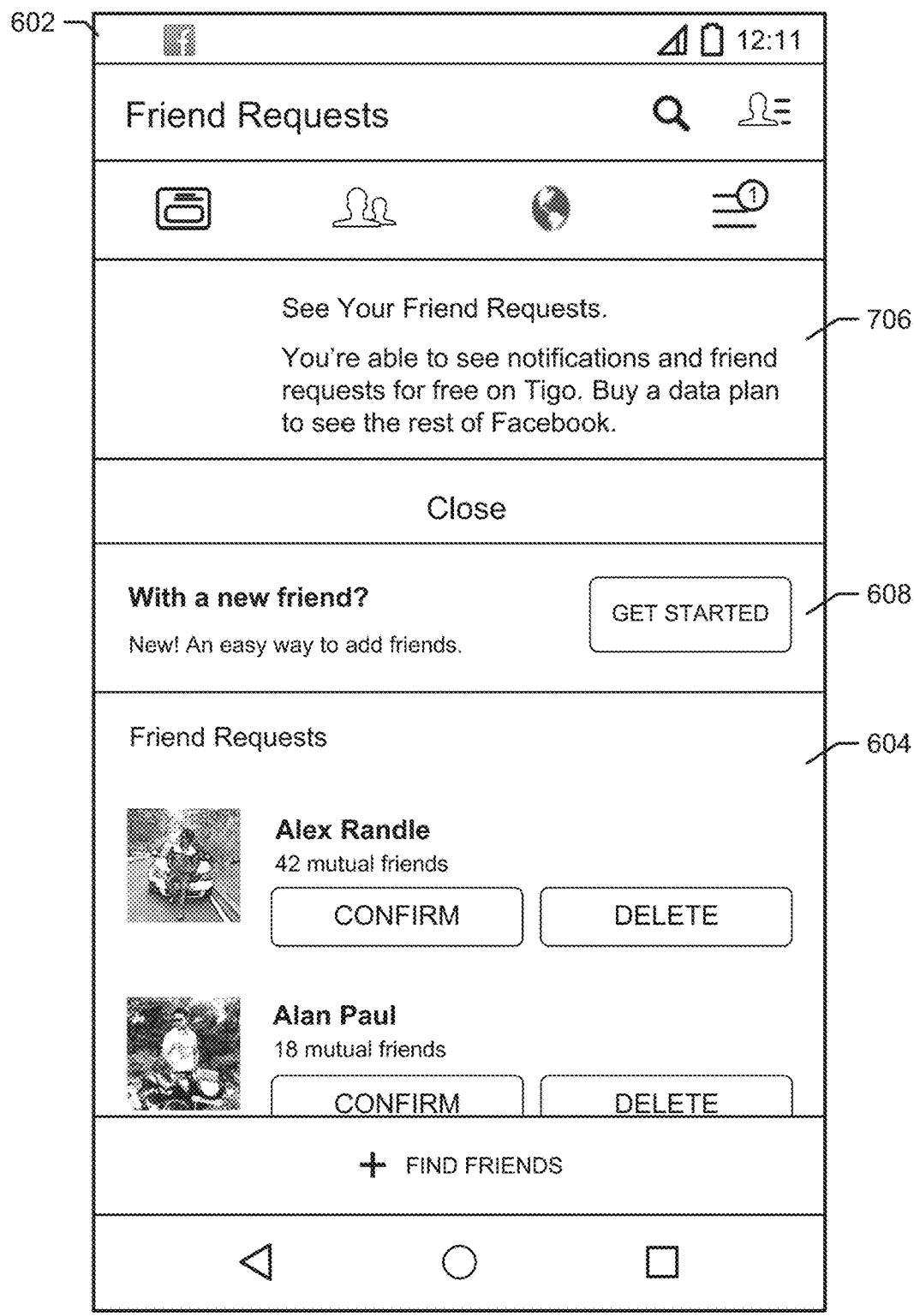

As illustrated in the examples of FIGS. 6-7, a UI 602 corresponding to a native application of social-networking system 160 may display information corresponding to friend requests 604 made through social-networking system 160. In particular embodiments, friend requests 604 may include information identifying a user of social-networking system, such as for example, a name or profile photo. Furthermore, friend requests 604 may include one or more graphical elements that each correspond to a function associated with each friend request 604 (e.g., confirming/accepting the friend request or denying/deleting the friend request) or information indicating a number of "friends" that are common to both users. UI 602 may include a graphical element 608 corresponding to the functionality to add new friends or information 606 indicating that friend requests 604 are being provided as part of a zero-rated service through one or more entities (e.g., cellular network provider or social network). In particular embodiments, additional information may be provided to the user in response to selecting information 606. As illustrated in the example of FIG. 7, information 706 may inform the user that additional functionality of social-networking system 160 is available upon purchase of data from a cellular network provider.

Figure 8:
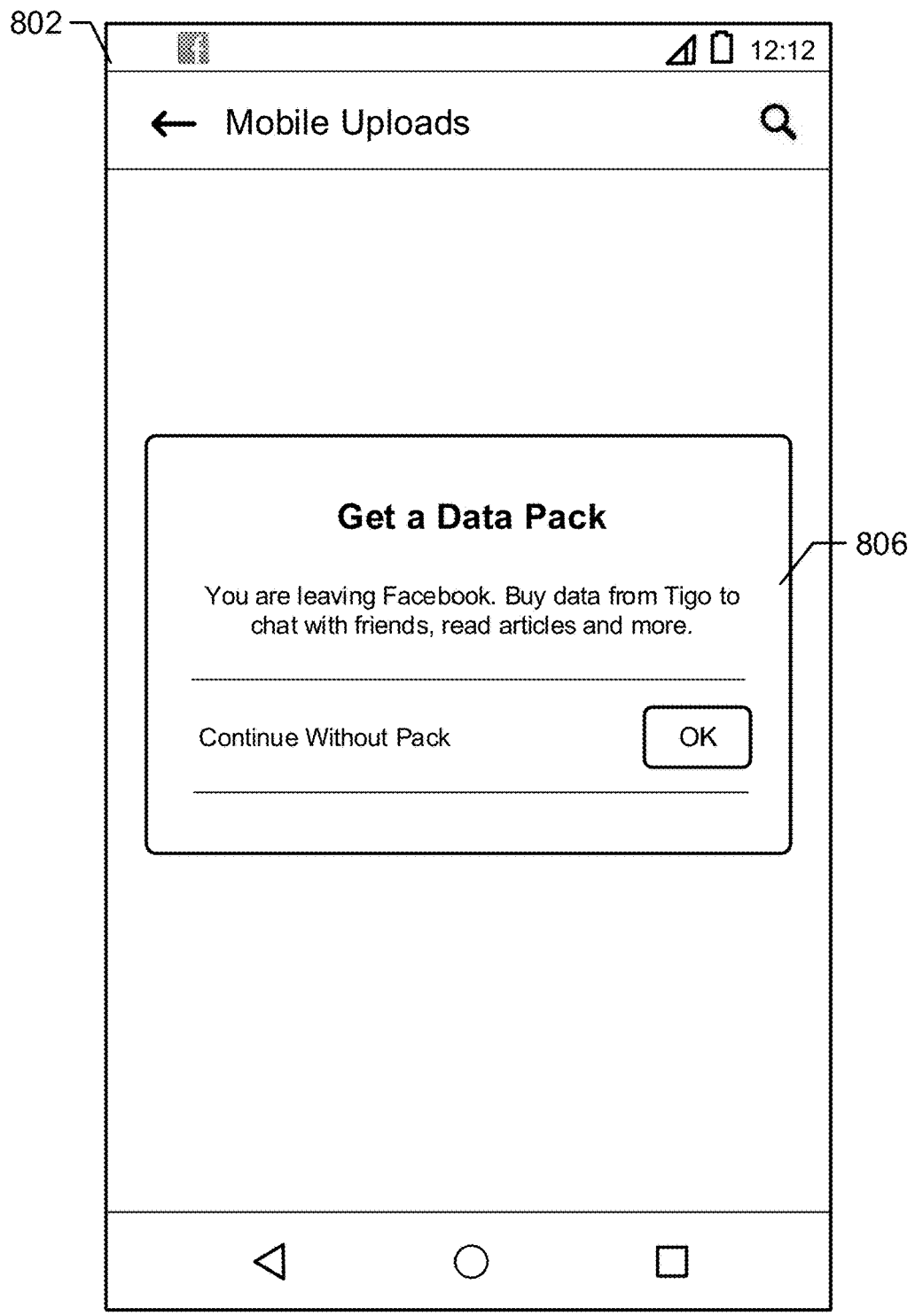

In particular embodiments, the user may select a function of social-networking system 160 that is not supported through a zero-rated service. As an example and not by way of limitation, uploading a content object (e.g., photo or video) to social-networking system 160 may be a function that is only supported through a full-service IP address. As illustrated in the example of FIG. 8, a UI 802 corresponding to a native application of social-networking system 160 may a function of social-networking system 160 displays content uploaded by a user. Based on a determination that the user only has access to social-networking system 160 through the zero-rated IP addresses, as described above, UI 802 may include a graphical element 806 (e.g. alert or banner) informing the user that full-service access to social-networking system 160 may be obtained by purchasing data. For example, graphical element 806 may show the user various data plan options that are available and allow the user to purchase additional data through the native application. As another example, graphical element 806 may direct the user to contact their carrier to purchase additional data.

Figure 9:
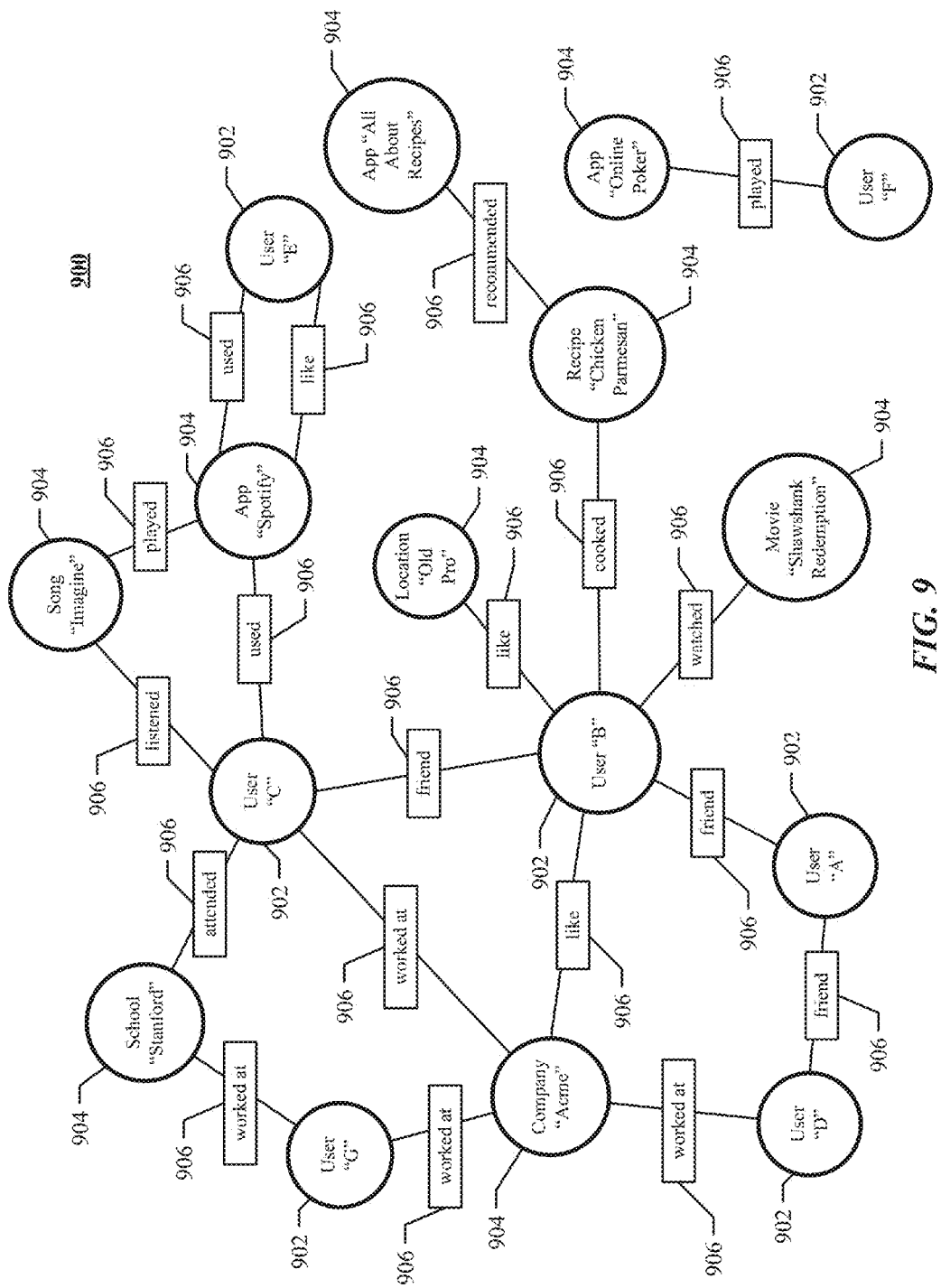
FIG. 9 illustrates an example social graph.

FIG. 9 illustrates an example social graph. In particular embodiments, social-networking system 160 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, social-networking system 160, client system 130, or third-party system 170 may access social graph 900 and related social-graph information for suitable applications. The nodes and edges of social graph 900 may be stored as data objects, for example, in a data store (such as a social-graph database). Such a data store may include one or more searchable or queryable indices of nodes or edges of social graph 900.

In particular embodiments, a user node 902 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 160. In particular embodiments, a user node 902 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 906 connecting the first user's user node 902 to the second user's user node 902 in social graph 900 and store edge 906 as social-graph information in one or more of data stores 164. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example, a user (user "C") may listen to a particular song ("Imagine") using a particular application (SPOTIFY, which is an online music application). In this case, social-networking system 160 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 160 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 160 may create an edge 906 between a user node 902 and a concept node 904 in social graph 900. As an example and not by way of limitation, a user viewing a concept-profile page (such as, for example, by using a web browser or a special-purpose application hosted by the user's client system 130) may indicate that he or she likes the concept represented by the concept node 904 by clicking or selecting a "Like" icon, which may cause the user's client system 130 to send to social-networking system 160 a message indicating the user's liking of the concept associated with the concept-profile page. In response to the message, social-networking system 160 may create an edge 906 between user node 902 associated with the user and concept node 904, as illustrated by "like" edge 906 between the user and concept node 904. In particular embodiments, social-networking system 160 may store an edge 906 in one or more data stores 164. In particular embodiments, an edge 906 may be automatically formed by social-networking system 160 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

Figure 10:
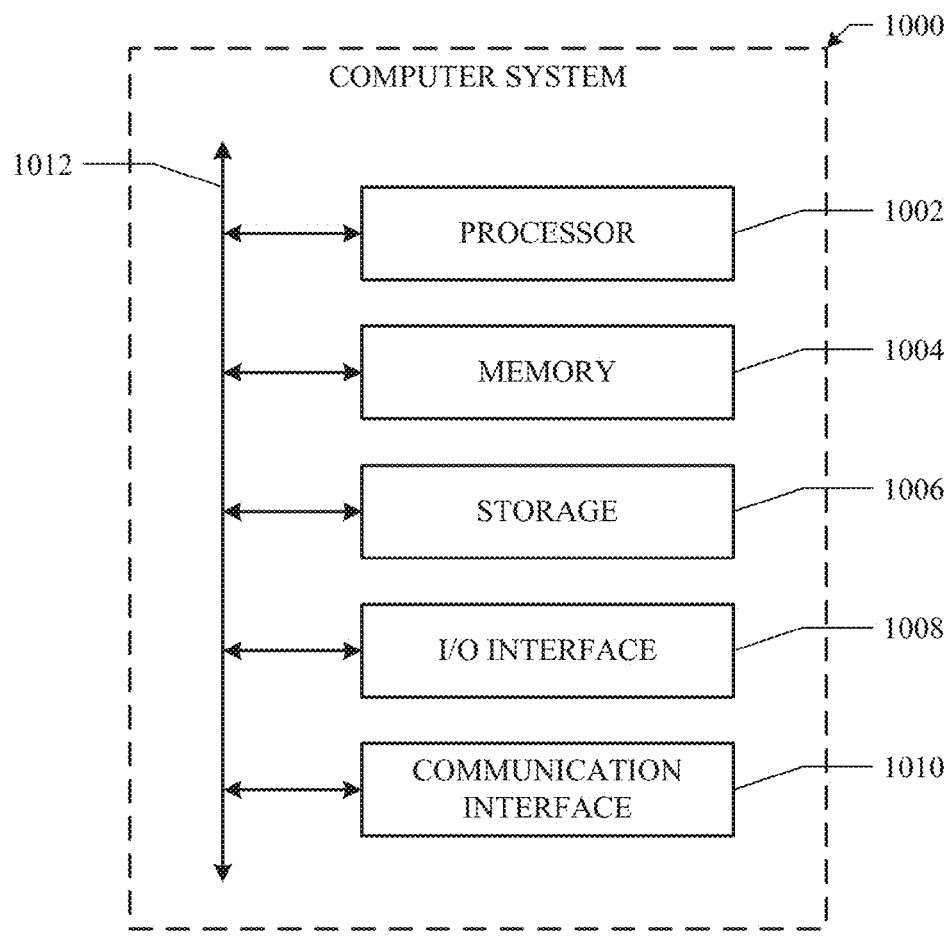
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a computing device, receiving a request from a client device for full-service data, wherein the request for full-service data is sent by the client device through a first Internet protocol (IP) address;
by the computing device, sending to the client device a response to the request for full-service data;
by the computing device, receiving a request from the client device for limited data, wherein the request for limited data is sent by the client device through a second IP address; and
by the computing device, sending to the client device a response to the request for limited data, wherein the limited data corresponds to a low-bandwidth mode that provides access to limited functionalities of a social-networking system to the client device.

2. The method of claim 1, wherein the first IP address corresponds to a paid service associated with the social-networking system, and wherein the second IP address corresponds to zero-rated service associated with the social-networking system.

3. The method of claim 1, wherein the response to the request for full-service data comprises an error message, partial response, unexpected response, or incorrect response.

4. The method of claim 1, wherein the response to the request for full-service data comprises data corresponding to a graphical element on a browser of the client device.

5. The method of claim 4, wherein the data corresponding to the graphical element comprises JAVASCRIPT code that renders a pixel on the browser of the client device.

6. The method of claim 1, wherein the request for limited data is sent by the client device in response to lack of data traffic between a native application of the client device and the social-networking system through the first IP address.

7. The method of claim 1, wherein the limited functionalities of the social-networking system comprise one or more of access to notifications of activity that is socially relevant to the user or access to friend requests.

8. The method of claim 1, wherein the limited data comprises information of one or more data plans of a cellular network provider.

9. The method of claim 8, wherein the information of one or more data plans comprises a banner displayed on the client device that allows the user to purchase data.

10. The method of claim 1, wherein the limited data comprises a short messaging service (SMS) message.

11. The method of claim 10, wherein the SMS message comprises a link to a mobile website of the social-networking system.

12. The method of claim 1, wherein the full-service data comprises a content object of the social-networking system.

13. The method of claim 12, wherein content object comprises a notification of a new post by a friend of the user, liking a post, or a comment of a post by friend of a user.

14. The method of claim 1, wherein the client device determines it is not connected to a network based on determining that a successful response to the request for limited data was not received.

15. The method of claim 1, wherein the client device determines a low or no data balance based on determining that a successful response to the request for full-service data was not received.

16. The method of claim 1, wherein the client device displays at least a portion of the limited data on a user interface (UI).

17. The method of claim 1, wherein the limited data comprises a subset of the full-service data.

18. The method of claim 1, wherein the computing device is a server of the social-networking system.

19. One or more computer-readable non-transitory storage media embodying software that is operable when executed to:
receive a request from a client device for full-service data, wherein the request for full-service data is sent by the client device through a first Internet protocol (IP) address;
send to the client device a response to the request for full-service data;
receive a request from the client device for limited data, wherein the request for limited data is sent by the client device through a second IP address; and
send to the client device a response to the request for limited data, wherein the limited data corresponds to a low-bandwidth mode that provides access to limited functionalities of a social-networking system to the client device.

20. A computing device comprising:
a processor; and
a memory coupled to the processor comprising instructions executable by the processor, the processor being operable when executing the instructions to:
receive a request from a client device for full-service data, wherein the request for full-service data is sent by the client device through a first Internet protocol (IP) address;
send to the client device a response to the request for full-service data;
receive a request from the client device for limited data, wherein the request for limited data is sent by the client device through a second IP address; and
send to the client device a response to the request for limited data, wherein the limited data corresponds to a low-bandwidth mode that provides access to limited functionalities of a social-networking system to the client device.

* * * * *